(12) United States Patent
Fujiwara et al.

(10) Patent No.: US 11,733,469 B2
(45) Date of Patent: Aug. 22, 2023

(54) PLANAR LIGHTWAVE CIRCUIT AND OPTICAL DEVICE

(71) Applicant: Nippon Telegraph and Telephone Corporation, Tokyo (JP)

(72) Inventors: Yuji Fujiwara, Musashino (JP); Satomi Katayose, Musashino (JP); Ryoichi Kasahara, Musashino (JP); Takahiro Kashiwazaki, Musashino (JP); Junji Sakamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 227 days.

(21) Appl. No.: 17/252,043

(22) PCT Filed: May 23, 2019

(86) PCT No.: PCT/JP2019/020465
§ 371 (c)(1),
(2) Date: Dec. 14, 2020

(87) PCT Pub. No.: WO2019/244554
PCT Pub. Date: Dec. 26, 2019

(65) Prior Publication Data
US 2021/0263219 A1    Aug. 26, 2021

(30) Foreign Application Priority Data
Jun. 18, 2018   (JP) ................................. 2018-115329

(51) Int. Cl.
*G02B 6/30*   (2006.01)
*G02B 6/34*   (2006.01)
*G02B 6/42*   (2006.01)

(52) U.S. Cl.
CPC ............. *G02B 6/4221* (2013.01); *G02B 6/30* (2013.01); *G02B 6/34* (2013.01)

(58) Field of Classification Search
CPC .......... G02B 6/30; G02B 6/34; G02B 6/4241; G02B 6/124; G02B 6/4221
See application file for complete search history.

(56) References Cited

U.S. PATENT DOCUMENTS

2013/0209026 A1\* 8/2013 Doany ..................... G02B 6/32
                                                                     438/32
2013/0301981 A1\* 11/2013 Li .......................... G02B 6/122
                                                                     438/24
(Continued)

FOREIGN PATENT DOCUMENTS

JP   H08-334655 A   12/1996
JP   2012-163765 A   8/2012
(Continued)

OTHER PUBLICATIONS

Osamu Mikami, *Passive Mounting of Optical Fibers using Single-Mode Optical Coupling-V Grooves*, Optical Wiring Mounting Technology Handbook, Sep. 9, 2008, pp. 92-95.

*Primary Examiner* — Michael P Mooney
(74) *Attorney, Agent, or Firm* — Workman Nydegger

(57) ABSTRACT

To provide a planar lightwave circuit capable of being optically connected to a semiconductor optical element or an optical wiring component in a simple, precise, and stable manner without an increase in circuit footprint or the number of fabrication steps or a deterioration of characteristics. By arranging a dummy optical waveguide having a mirror function in the vicinity of an input/output waveguide of an optical functional circuit forming the planar lightwave circuit, a semiconductor optical element or an optical wiring component can be easily aligned with and fixed to the optical functional circuit by monitoring the reflection light intensity (Continued)

from the dummy optical waveguide. When the optical functional circuit has a plurality of input/output waveguides to be optically connected, each input/output waveguide can be identified if the dummy optical waveguides having the mirror function have different reflection properties (such as reflectance, width, position, or reflection wavelength).

19 Claims, 3 Drawing Sheets

(56) References Cited

U.S. PATENT DOCUMENTS

| | | | |
|---|---|---|---|
| 2015/0355421 A1* | 12/2015 | Li | G02B 6/4225 250/227.14 |
| 2018/0010906 A1 | 1/2018 | Tokushima | |
| 2020/0057192 A1 | 2/2020 | Nakanishi et al. | |

FOREIGN PATENT DOCUMENTS

| | | | | |
|---|---|---|---|---|
| JP | 2018-77276 A | * | 5/2017 | G02B 6/4225 |
| JP | 2018-5067 A | | 1/2018 | |
| JP | 2018-77276 A | | 5/2018 | |

* cited by examiner

PLANAR LIGHTWAVE CIRCUIT AND OPTICAL DEVICE

TECHNICAL FIELD

The present invention relates to an optical waveguide structure.

BACKGROUND ART

The optical technologies are finding an increasing variety of applications, and there is an increasing demand for advanced and small optical modules (optical components). A planar lightwave circuit, which has an optical waveguide formed on a substrate, can be used to implement various small optical circuits and is used as a component of optical modules. Various advanced optical modules are being implemented by integrating planar lightwave circuits having different functions or integrating a planar lightwave circuit with a spatial optical component, such as a spatial phase modulator.

When coupling waveguides of two planar lightwave circuits, coupling a core of an optical fiber to a waveguide of a planar lightwave circuit, or coupling a light-emitting element or light-receiving element to a planar lightwave circuit, the optical axes of the optical components need to be precisely aligned with each other. As described in Non-Patent Literature 1, according to a conventional method referred to as active packaging, a rough alignment is performed by monitoring the end of the core of the waveguide and its surroundings on the end face of the substrate with a high-powered camera, and then an adjustment is performed to achieve the highest coupling factor by measuring the intensity of light that is incident on the waveguide, which is one of the components to be connected, passes through the connection part and is then coupled to the optical component, which is the other of the components to be connected. In this case, an optical axis alignment is required when light is incident on the waveguide, which is one of the optical components to be connected, and the increase of the number of steps leads to an increase of the cost of connecting the optical components. Furthermore, if an element whose optical axis is to be aligned cannot guide visible light, or if the core is very small, it is difficult to locate the core in the monitoring with a CCD camera or the like. In the method disclosed in Patent Literature 1, the location of the core of the waveguide is facilitated by etching the opposite sides of the core. In the method disclosed in Patent Literature 2, an aligning waveguide is additionally provided to allow planar lightwave circuits to be connected to each other without connecting a fiber to a waveguide for an optical circuit.

CITATION LIST

Patent Literature

Patent Literature 1: Japanese Patent Laid-Open No. 8-334655
Patent Literature 2: Japanese Patent Laid-Open No. 2012-163765

Non-Patent Literature

Non-Patent Literature 1: "hikari haisen jissou gijutu handbook (in Japanese) (Optical Interconnection Packaging Technology Handbook)", Osamu Mikami, Sep. 9, 2008, p. 92-p. 95

SUMMARY OF THE INVENTION

Technical Problem

The background art has the problems described below. The method disclosed in Patent Literature 1 has a problem that a step of etching the opposite sides of the core is required, so that the cost increases. The method disclosed in Patent Literature 2 has problems that the footprint increases because of the aligning waveguide additionally provided on the planar lightwave circuit and that there is a structural restriction to prevent the aligning waveguide does not intersect with other waveguides.

The present invention has been devised in view of the problems described above, and an object of the present invention is to provide, at low cost, a planar lightwave circuit capable of being optically connected to a semiconductor optical element or an optical wiring component in a simple, precise, and stable manner without an increase in circuit footprint or fabrication cost or a deterioration of characteristics.

Means for Solving the Problem

To attain the object described above, a planar lightwave circuit according to a first aspect of the present invention is a planar lightwave circuit including: a substrate; an optical functional circuit including an optical waveguide having a core layer and a cladding layer on the substrate; and at least one first input/output waveguide connected to the optical functional circuit and to an end face of the substrate, wherein the planar lightwave circuit further includes at least one second input/output waveguide at the end face of the substrate to which the first input/output waveguide is connected, the second input/output waveguide is provided with a mirror structure that reflects light propagating through the second input/output waveguide, and the mirror structure is arranged in a region spaced apart from an input/output end of the first input/output waveguide in order that light propagating through a core of the first input/output waveguide is not coupled to the mirror structure.

To attain the object described above, a planar lightwave circuit according to a second aspect of the present invention is the planar lightwave circuit according to the first aspect described above, wherein two rows of the mirror structures are arranged on one side of the first input/output waveguide.

A planar lightwave circuit according to a third aspect of the present invention that attains the object described above is the planar lightwave circuit according to the first or second aspect described above, wherein core layers of the optical functional circuit, the first input/output waveguide and the second input/output waveguide provided with the mirror structure are made of a same material.

A planar lightwave circuit according to a fourth aspect of the present invention that attains the object described above is the planar lightwave circuit according to the first or third aspect described above, wherein at least one second input/output waveguide is arranged on each side of each first input/output waveguide.

A planar lightwave circuit according to a fifth aspect of the present invention that attains the object described above is the planar lightwave circuit according to any one of the first to fourth aspects described above, wherein the mirror structure is a mirror structure including a Bragg grating.

A planar lightwave circuit according to a sixth aspect of the present invention that attains the object described above is the planar lightwave circuit according to any one of the first to fourth aspects described above, wherein the mirror structure is a mirror structure including a groove provided to cut a waveguide or a thin film of a dielectric or metal formed on a wall surface of the groove.

A planar lightwave circuit according to a seventh aspect of the present invention that attains the object described above is the planar lightwave circuit according to the first, third or fifth aspect described above, wherein the planar lightwave circuit includes at least two first input/output waveguides, each of the first input/output waveguides is provided with at least two second input/output waveguides arranged on opposite sides of the first input/output waveguide, and second input/output waveguides provided for different first input/output waveguides differ in at least one of width, number, reflectance, and reflection wavelength.

Effects of the Invention

According to the present invention, since at least one second input/output waveguide with a mirror structure connected thereto is provided on the end face of the substrate to which the first input/output waveguide is connected, when the end face of the substrate is scanned with laser light focused into a spot, the position of the mirror structure can be determined based on the distribution of the reflected light, and the position of the first input/output waveguide can be determined based on the position of the mirror structure.

In addition, since the mirror structure is a Bragg grating formed by processing a core layer made of the same material as those of the first input/output waveguide and the second input/output waveguide, no additional step is required, and the mirror structure can be fabricated with high precision.

In addition, since at least one second input/output waveguide is formed on each side of the first input/output waveguide, the reflected light can be more easily distinguished from reflected light from a scratch or soil on the end face.

In addition, when the process includes a step of forming a groove on the planar lightwave circuit, the mirror structure may be formed at low cost as a groove formed to cut a waveguide or a thin film of a dielectric or metal formed on a wall surface of the groove.

In addition, with the planar lightwave circuit including at least two first input/output waveguides, each of which is provided with at least two second input/output waveguides arranged on opposite sides of the first input/output waveguide, if the planar lightwave circuit is fabricated in such a manner that second input/output waveguides provided for different first input/output waveguides differ in at least one of width, number, reflectance, and reflection wavelength, the plurality of first input/output waveguides can be distinguished from each other.

DESCRIPTION OF EMBODIMENTS

Figure 1A:
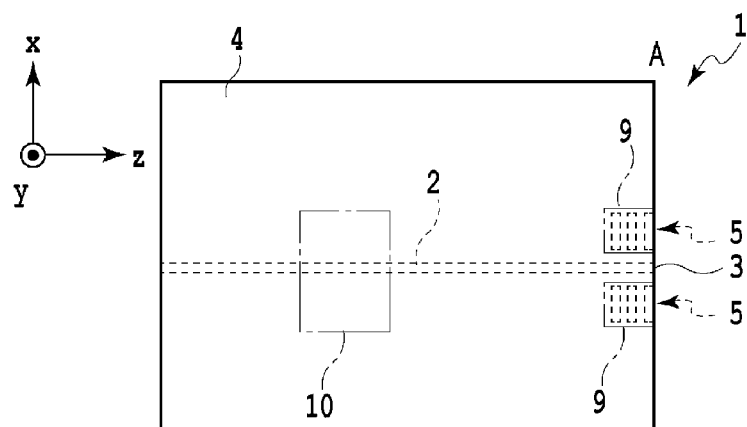
FIGS. 1(a)-1(d) include views of a planar lightwave circuit according to a first embodiment of the present invention.

In the following, forms of planar lightwave circuits according to the present invention will be described in detail with reference to the drawings. However, the present invention is not limited to the specific embodiments described below, and it is obvious to those skilled in the art that various modifications can be made to the forms and details without departing from the spirit of the present invention disclosed in this specification or the like. The configurations according to the embodiments can be appropriately combined as required. In the configurations of the present invention described below, the same components or the components having the same functions are denoted by the same reference numerals.

First Embodiment

FIG. 1 show a planar lightwave circuit according to a first embodiment of the present invention. FIG. 1(a) is a top view, FIG. 1 (b) is a view of an end face of the planar lightwave circuit indicted by the line A-A', and FIGS. 1(c) and 1(d) are enlarged views showing different examples of a mirror portion.

Figure 1B:
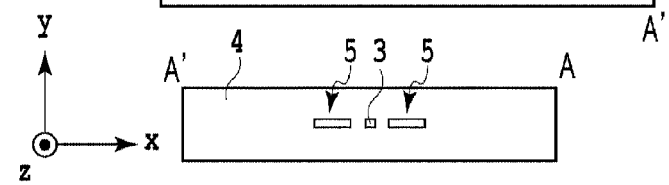
Figure 1C:
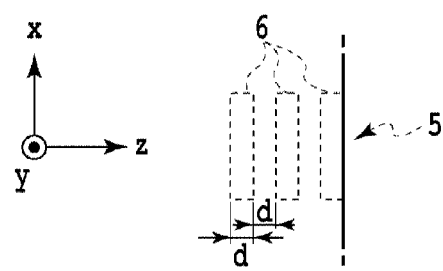

As shown in FIG. 1(a), a planar lightwave circuit 1 is a planar lightwave circuit including a substrate, an optical functional circuit 10 including an optical waveguide having a core (layer) 2 and a cladding (layer) 4 on the substrate, and at least one first input/output waveguide connected to the optical functional circuit 10 and to an end face of the substrate, the planar lightwave circuit 1 further includes at least one second input/output waveguide 9 serving as a dummy at the end face of the substrate to which the first input/output waveguide is connected, the second input/output waveguide 9 is provided with a mirror structure 5 that reflects light having propagated through the second input/output waveguide, and the mirror structure 5 is arranged in a region spaced apart from an input/output end 3 of the first input/output waveguide in order that light propagating through the core 2 of the first input/output waveguide is not coupled to the mirror structure 5. The first input/output waveguide, the second input/output waveguide 9, the optical functional circuit 10 connected to the first input/output waveguide, and the waveguide connected to the optical functional circuit 10 are made of the material of the core 2 and the material of the cladding 4 covering the core 2, which have different dielectric constants. The mirror structure 5 is made of the same material as the core 2 and is formed in the same step as the core 2. The materials having different dielectric constants described above include silica glass and pure silica glass doped with boron, fluorine, phosphor, or germanium, for example. As shown in FIG. 1(b), the mirror structure 5 is formed in the same layer as the core 2 and arranged on the end face A-A' of the waveguide. FIG. 1(c) shows the mirror structure, which includes three structural bodies 6 arranged side by side, for example. This grating mirror structure needs to be arranged in a region sufficiently spaced apart from the input/output end 3 of the first input/output waveguide in order that the light propagating through the core 2 is not coupled to the mirror structure. In this embodiment, for example, when the relative refractive-index difference between the material of the core and the material of the cladding is $\Delta$=0.3%, the grating mirror can be arranged at a distance of 20 μm from the input/output end of the first input/output waveguide. The grating mirror structure 5 can be fabricated at the same time as the core 2, so that no additional fabrication step is required, and the grating mirror structure 5 can be fabricated at low cost. For this planar lightwave circuit, a reflection light intensity distribution can be obtained by scanning the end face A-A' of the substrate with a laser light focused into a spot. In the scanning, if a width d of the structural body 6 in a z-axis direction and a wavelength λ of the laser light satisfy the following formula 1, the reflection intensity of the mirror structure 5 is high.

$$m\lambda = 2d \sin \theta \quad \text{(Formula 1)}$$

m: arbitrary integer
λ: wavelength of reference light
d: width of structural body 6 in z-axis and distance between structural bodies 6
θ: glancing angle of reference light From the reflection intensity distribution, the position of the mirror structure 5 provided on the end face of the substrate can be determined. In addition, since the positional relationship between the mirror structure 5 and the core 2 is determined in the design stage, the position of the input/output end 3 of the core 2 can be determined from the position of the mirror structure 5.

By aligning the optical axes of the planar lightwave circuit and any of a light-emitting element, a light-receiving element, a planar lightwave circuit, and other optical functional components with the determined position of the input/output end 3 of the core 2 with a multi-axis stage, these components can be connected to each other.

Figure 1D:
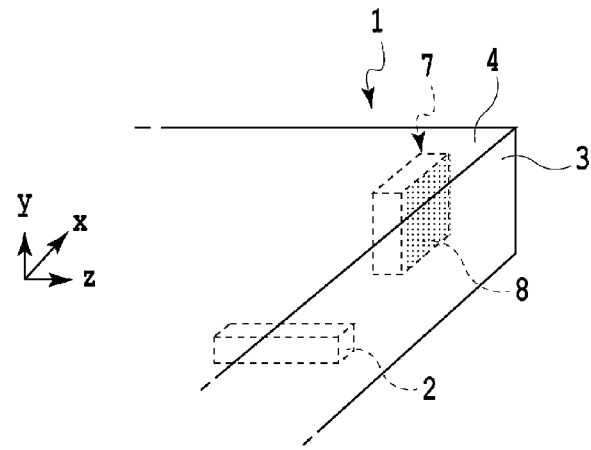

The mirror structure described above is not limited to the grating mirror. As shown in FIG. 1(d), a groove structure fabricated by etching or a mirror formed by vapor-depositing a film of metal, such as aluminum, gold, chromium, nickel, titanium, platinum, or a mixture thereof, on a wall surface of the groove structure (a surface away from the end face A-A') may be arranged at the position of the grating mirror described above.

The method described above totally differs from the conventional method in that light does not need to be incident on the core 2 of the waveguide, no aligning waveguide needs to be provided, and no additional fabrication step is needed. Therefore, compared with the conventional method, the planar lightwave circuit and an optical functional component can be connected to each other at low cost and without an increase of the circuit footprint.

Although a quartz-based waveguide has been described in this embodiment, a polymer waveguide, a LiNbO$_3$ waveguide, or a semiconductor waveguide made of silicon, gallium, arsenic, aluminum, or indium can also be used.

If at least two rows of second input/output waveguides 9 provided with a mirror structure are arranged as described below, reflected light from the mirror structure and reflected light from a scratch in the end face can be distinguished. In this embodiment, the second input/output waveguide 9 including three structural bodies 6 arranged in a line is arranged in a region spaced apart from the input/output end 3 of the first input/output waveguide, in order that the light propagating through the core 2 is not coupled to the second input/output waveguide 9. As the number of second input/output waveguides 9 increases, the regularity of the position of the reflected light becomes more obvious, and the reflected light can be more easily distinguished from light reflected from a scratch or soil on the end face. However, when the light reflection from a scratch or soil does not have to be considered, the second input/output waveguide 9 formed by one row of structural bodies 6 can be used. That is, the second input/output waveguide may be provided on both sides or one side of the first input/output waveguide.

Second Embodiment

Figure 2:
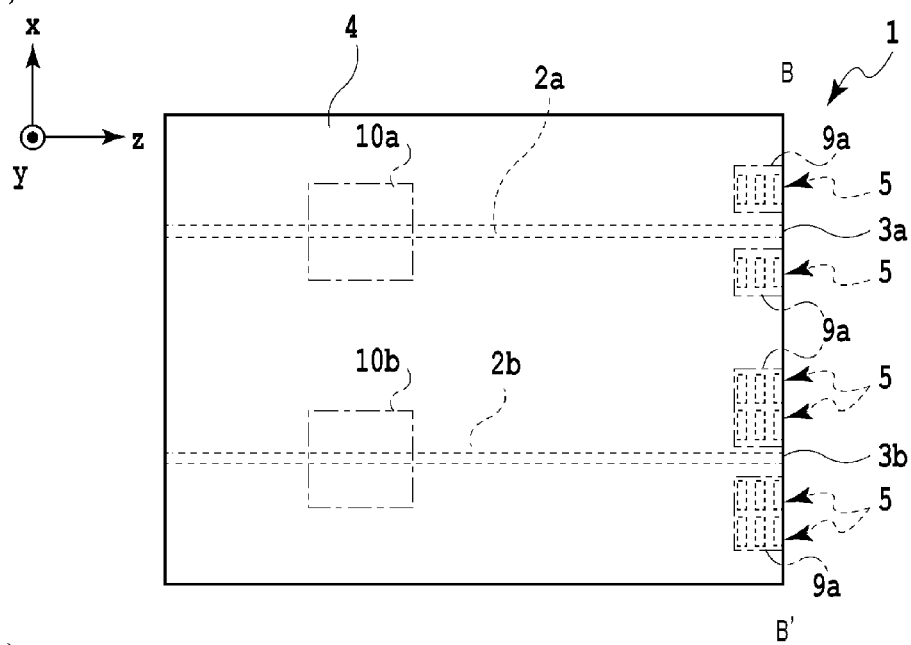
FIGS. 2(a) and 2(b) include views of a planar lightwave circuit according to a second embodiment of the present invention.
Figure 2:
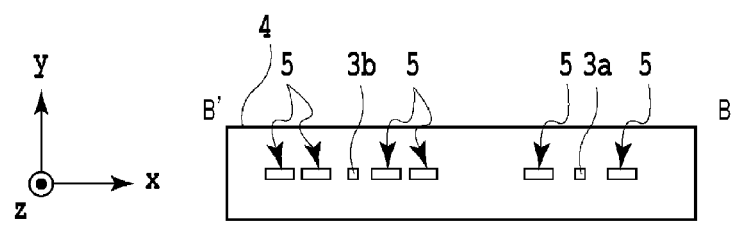

FIG. 2 shows a planar lightwave circuit according to a second embodiment of the present invention.

While a single core 2 is formed in the planar lightwave circuit 1 in the first embodiment, a plurality of cores 2a and 2b are formed in the same planar lightwave circuit 1 in this embodiment as shown in FIG. 2(a).

As shown in FIG. 2(b), which shows an end face B-B' of a planar lightwave circuit 1, grating mirror structures 5 are arranged on the opposite sides of an input/output end 3a of the core 2a in an x-axis direction as in the first embodiment, and two grating mirror structures 5 similar to those in the first embodiment are arranged on each of the opposite sides of an input/output end 3b of the core 2b in the x-axis direction. A row of second input/output waveguide 9a is provided on each of the opposite sides of a first input/output waveguide having the input/output end 3a, and two rows of second input/output waveguides 9a are provided on each of the opposite sides of a first input/output waveguide having the input/output end 3b. that is, two mirror structures 5 are arranged side by side. The first input/output waveguide having the input/output end 3a is connected to an optical functional circuit 10a including a waveguide, and the first input/output waveguide having the input/output end 3b is connected to the optical functional circuit 10b.

In this case, in the reflection light intensity distribution on the end face B-B' of the planar lightwave circuit, one peak of reflection intensity is observed on each side of the input/output end 3a of the core 2a in the x-axis direction, and two peaks are observed on each side of the input/output end 3b of the core 2b in the x-axis direction. The core 2a and the core 2b can be distinguished from each other based on the difference of the distribution of the reflection peaks. This embodiment is highly useful when connecting a plurality of light-emitting elements, light-receiving elements, or optical functional components to the end face of one planar lightwave circuit.

Although this embodiment has been described above with regard to an example in which there are two input/output ends 3a and 3b of two first input/output waveguides on one planar lightwave circuit, the number of the input/output ends of the waveguides is not limited to two, and the present invention can be applied to a planar lightwave circuit having two or more input/output ends of two or more waveguides by changing the number of the mirror structures 5 according to the number of the input/output ends of waveguides. The second input/output waveguide may be provided only on one side, or a plurality of second input/output waveguides may be provided.

Third Embodiment

In relation to the second embodiment, a third embodiment concerns another method of distinguishing a plurality of waveguides. This embodiment concerns examples in which second input/output waveguides 9a to 9d provided on the opposite sides of first input/output waveguides having input/output ends 3a and 3b have different numbers of mirror structures having different lengths. Second input/output waveguides 9a are provided on the opposite sides of a first input/output waveguide having the input/output end 3a, and a core 2a of the first input/output waveguide is connected to an optical functional circuit 10a. Second input/output waveguides 9b are provided on the opposite sides of a first input/output waveguide having the input/output end 3b, and a core 2b of the first input/output waveguide is connected to an optical functional circuit 10b. Second input/output waveguides 9c are provided on the opposite sides of a first input/output waveguide having an input/output end 3c, and a core 2c of the first input/output waveguide is connected to an optical functional circuit 10c. Second input/output waveguides 9d are provided on the opposite sides of a first input/output waveguide having an input/output end 3d, and a core 2d of the first input/output waveguide is connected to an optical functional circuit 10d.

Figure 3:
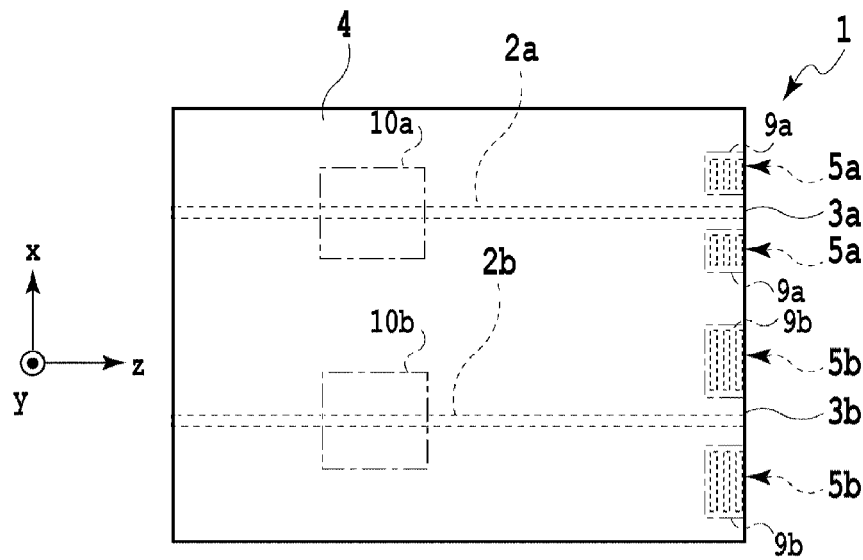
FIGS. 3(a) and 3(b) include views of planar lightwave circuits according to a third embodiment of the present invention.
Figure 3:
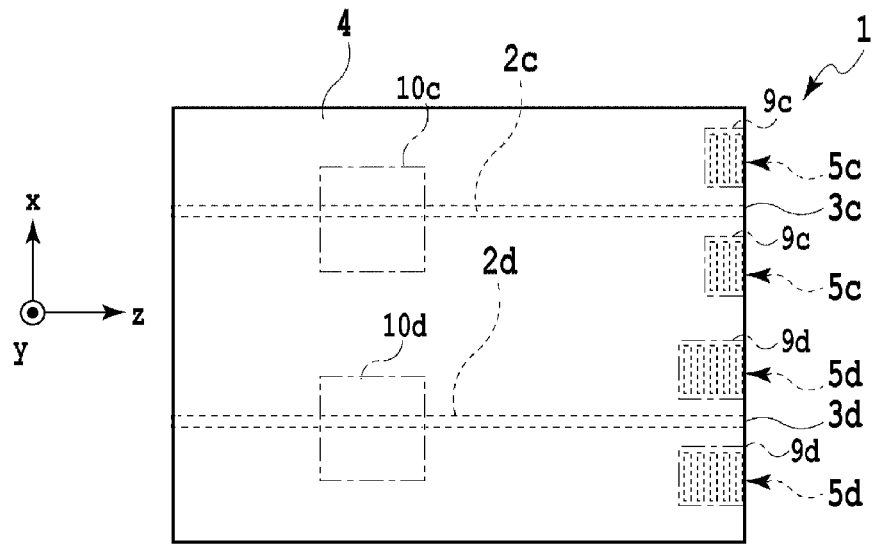

As shown in FIG. 3(a), grating mirror structures 5a and 5b provided for the second input/output waveguides 9a and 9b have different widths in the x-axis direction, and therefore, the peaks of the reflection light from the grating mirror structures 5a and 5b in the reflection intensity distribution have different shapes.

In the case shown in FIG. 3(a), the grating mirror structure 5a has a smaller width in the x-axis direction than the grating mirror structure 5b. The mirror structures 5a and 5b can be distinguished from each other based on the difference in shape between the peaks of the reflection intensity, the input/output ends 3a and 3b of the plurality of waveguides can be distinguished from each other.

As another example, as shown in FIG. 3(b), the grating mirror structures 5 may include different numbers of structural bodies 6 arranged in the z-axis direction and thereby have different reflection intensities.

In the case shown in FIG. 3(b), grating mirror structures 5d provided for the second input/output waveguide 9d have a higher reflection light intensity than grating mirror structures 5c provided for the second input/output waveguide 9c because of the difference in the number of structural bodies 6. The mirror structures 5c and 5d can be distinguished from each other based on the difference in reflection intensity, the input/output ends 3c and 3d of the plurality of waveguides can be distinguished from each other. For example, by setting the reflection intensity of the grating mirror structure 5c to be twice as high as or a half of the reflection intensity of the grating mirror structure 5d, the grating mirror structure 5c and the grating mirror structure 5d can be distinguished from each other.

By providing at least two second input/output waveguides 9a to 9d in such a manner that the second input/output waveguides 9a to 9d provided for different first input/output waveguides differ in at least one of width, number, reflectance, or reflection wavelength, a plurality of first input/output waveguides can be distinguished from each other.

Fourth Embodiment

An optical device can be produced by connecting any of an optical fiber, a laser, a photodiode, and an optical modulator to the planar lightwave circuit according to any of the first to third embodiments in such a manner that the element is optically coupled to a first input/output waveguide of the planar lightwave circuit.

INDUSTRIAL APPLICABILITY

The present invention can be applied to an optical waveguide structure.

REFERENCE SIGNS LIST

1 Planar Lightwave Circuit
2, 2a, 2b, 2c, 2d Core
3, 3a, 3b, 3c, 3d Input/output End of Waveguide
4 Cladding
5 Mirror Structure
5a, 5b, 5c, 5d Grating Mirror Structure
6 Structural Body forming Grating Mirror Structure
7 Groove Structure
8 Wall Surface of Groove Structure
9a, 9b, 9c, 9d Second Input/output Waveguide
10a, 10b, 10c, 10d Optical Functional Circuit

The invention claimed is:

1. A planar lightwave circuit, comprising:
a substrate;
an optical functional circuit including an optical waveguide having a core layer and a cladding layer on the substrate; and
at least one first input/output waveguide connected to the optical functional circuit and to an end face of the substrate,
wherein the planar lightwave circuit further comprises at least one second input/output waveguide at the end face of the substrate to which the first input/output waveguide is connected,
the second input/output waveguide is provided with a mirror structure at the end face of the substrate that reflects light propagating through the second input/output waveguide, and
the mirror structure is arranged in a region spaced apart from an input/output end of the first input/output waveguide in order that light propagating through a core of the first input/output waveguide is not coupled to the mirror structure,
wherein a reflection intensity distribution is obtained by scanning the end face of the substrate and wherein a position of the at least one second input/output waveguide is determined from the reflection intensity distribution.

2. The planar lightwave circuit according to claim 1, wherein two sets of the mirror structures are arranged on one side of the first input/output waveguide.

3. The planar lightwave circuit according to claim 1, wherein core layers of the optical functional circuit, the first input/output waveguide and the second input/output waveguide provided with the mirror structures are made of a same material.

4. The planar lightwave circuit according to claim 1, wherein at least one second input/output waveguide is arranged on each side of each first input/output waveguide.

5. The planar lightwave circuit according to claim 1, wherein the mirror structure is a mirror structure including a Bragg grating.

6. The planar lightwave circuit according to claim 1, wherein the mirror structure is a mirror structure including a groove provided to cut a waveguide or a thin film of a dielectric or metal formed on a wall surface of the groove.

7. The planar lightwave circuit according to claim 1, wherein the planar lightwave circuit comprises at least two first input/output waveguides,
each of the first input/output waveguides is provided with at least two second input/output waveguides arranged on opposite sides of the first input/output waveguide, and
the second input/output waveguides provided for different first input/output waveguides differ in at least one of width, number, reflectance, and reflection wavelength.

8. An optical device, comprising:
the planar lightwave circuit according to claim 1,
wherein any of an optical fiber, a laser, a photodiode, and an optical modulator is connected to the planar lightwave circuit in such a manner that the optical fiber, the laser, the photodiode, or the optical modulator is optically coupled to the first input/output waveguide.

9. The planar lightwave circuit according to claim 2, wherein core layers of the optical functional circuit, the first input/output waveguide and the second input/output waveguide provided with the mirror structures are made of a same material.

10. The planar lightwave circuit according to claim 2, wherein at least one second input/output waveguide is arranged on each side of each first input/output waveguide.

11. The planar lightwave circuit according to claim 3, wherein at least one second input/output waveguide is arranged on each side of each first input/output waveguide.

12. The planar lightwave circuit according to claim 2, wherein the mirror structure is a mirror structure including a Bragg grating.

13. The planar lightwave circuit according to claim 3, wherein the mirror structure is a mirror structure including a Bragg grating.

14. The planar lightwave circuit according to claim 4, wherein the mirror structure is a mirror structure including a Bragg grating.

15. The planar lightwave circuit according to claim 2, wherein the mirror structure is a mirror structure including a groove provided to cut a waveguide or a thin film of a dielectric or metal formed on a wall surface of the groove.

16. The planar lightwave circuit according to claim 3, wherein the mirror structure is a mirror structure including a groove provided to cut a waveguide or a thin film of a dielectric or metal formed on a wall surface of the groove.

17. The planar lightwave circuit according to claim 4, wherein the mirror structure is a mirror structure including a groove provided to cut a waveguide or a thin film of a dielectric or metal formed on a wall surface of the groove.

18. The planar lightwave circuit according to claim 3, wherein the planar lightwave circuit comprises at least two first input/output waveguides, each of the first input/output waveguides is provided with at least two second input/output waveguides arranged on opposite sides of the first input/output waveguide, and the second input/output waveguides provided for different first input/output waveguides differ in at least one of width, number, reflectance, and reflection wavelength.

19. The planar lightwave circuit according to claim 5, wherein the planar lightwave circuit comprises at least two first input/output waveguides, each of the first input/output waveguides is provided with at least two second input/output waveguides arranged on opposite sides of the first input/output waveguide, and the second input/output waveguides provided for different first input/output waveguides differ in at least one of width, number, reflectance, and reflection wavelength.

* * * * *